United States Patent Office 2,883,600
Patented Apr. 21, 1959

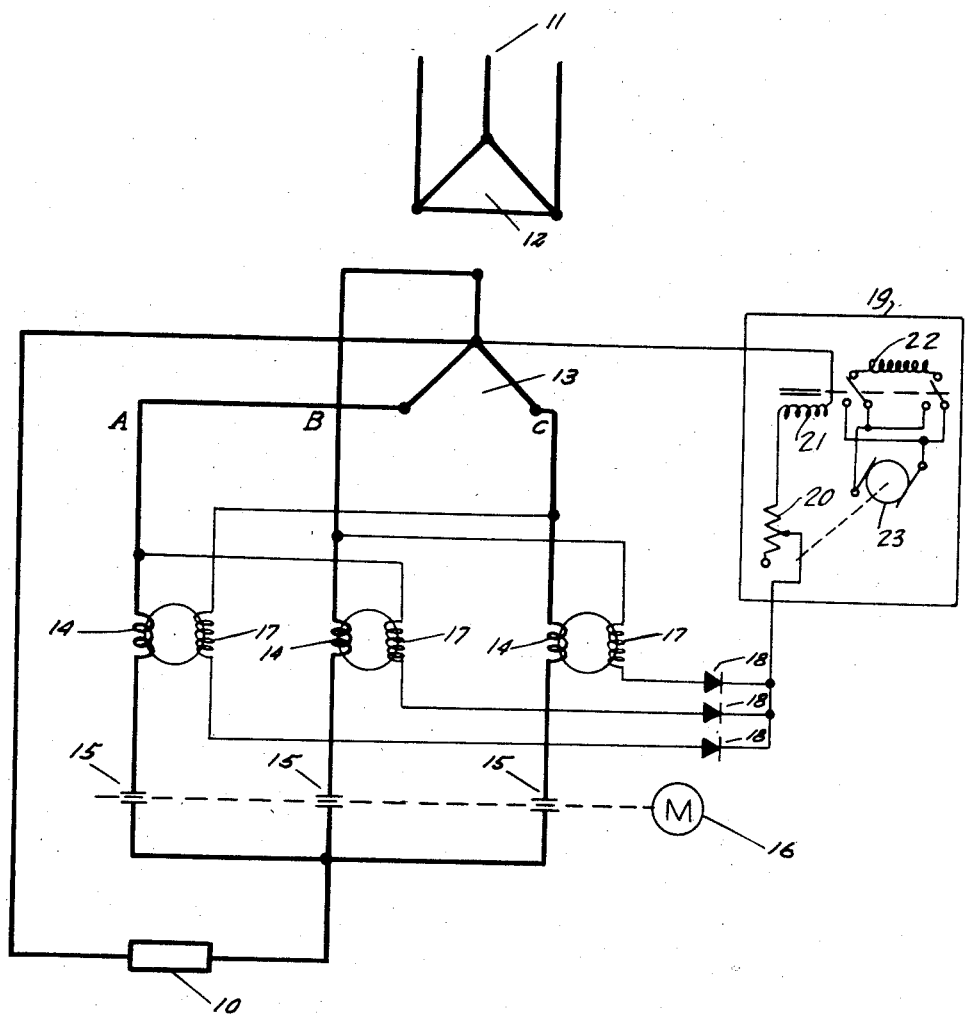

2,883,600

CONSTANT CURRENT FLUX REVERSAL CIRCUIT FOR MECHANICAL RECTIFIERS

Hans-Joachim Kleinvogel, Berlin-Siemensstadt, and Fritz Notzold, Berlin-Frohnau, Germany, assignors to Siemens-Schuckertwerke A.G., Berlin and Erlangen, Germany, a corporation of Germany Application January 31, 1955, Serial No. 485,058

5 Claims. (Cl. 321—48)

Our invention relates to a flux reversal circuit for rectifying apparatus having a commutating reactor in series with a cooperating contact.

The principle of our invention is to provide a flux reversal circuit which is energized from the A.-C. source which supplies energy to the rectifying apparatus and to provide means to maintain the flux reversal current at a predetermined value irregardless of variations in the A.-C. voltage or the component parts of the circuit.

Although our novel invention can be applied to any device using a commutating reactor, for the sake of simplicity, our invention is described hereinafter with reference to mechanical rectifiers.

In general, mechanical rectifiers convert A.-C. power to D.-C. power as follows:

An alternating potential is impressed across a contact and series connected load. This contact is opened and closed in synchronism with the impressed alternating potential. When the alternating potential is in the direction desired for the load potential, the contact is closed and the input alternating potential falls across the load. When the alternating potential subsequently reverses, the contact is opened and the alternating potential then falls across the open contact. Hence, by opening and closing the contacts in synchronism with the input alternating potential, a unidirectional potential can be impressed on the load.

In order to provide a low-current step in which the contact can be repeatedly opened and closed, a commutating reactor is placed in series with the contact. Commutating reactors have a core material made of a high permeability material and their construction and operation are clearly described in United States Patent No. 2,693,569, issued to Edward John Diebold, November 2, 1954, and assigned to the assignee of the instant application.

When the commutating reactor is unsaturated, it limits the current through the contact to approximately one thousandth of its peak value. Hence, when the contact is closed to allow the alternating potential to fall across the load, the commutating reactor unsaturates and limits the inrush current to the value of its magnetizing current until the commutating reactor saturates. After the commutating reactor saturates, the current rises to a value given by the impedance of the load and rectifying system. When the alternating potential reverses, the load current decreases to zero current, the commutating reactor unsaturates once again and a low current step is provided in which the contact can be safely opened.

Magnetic voltage control as described in copending application Serial No. 423,358, filed April 15, 1954, now Patent No. 2,817,805, can now be incorporated into this circuit. After the contact closes to allow the alternating potential to fall across the load, it falls across the extremely high impedance of the commutating reactor instead. Therefore, the potential which should fall across the load does not appear there until the commutating reactor saturates. It is now obvious that by varying the period of unsaturation of the commutating reactor during the make interval, the voltage falling across the load is varied. This type voltage control is herein called magnetic control.

The degree of unsaturation of the commutating reactor for magnetic control can be achieved by a predetermined amount of flux reversal of the commutating reactor prior to the time the contact is closed. Hence, if the commutating reactor flux is not reversed prior to contact closure, the alternating potential after contact closure will fall on the commutating reactor until the flux is completely reversed. Therefore, a minimum voltage will fall on the load. If, however, the commutating reactor is completely reversed prior to contact closure, the alternating potential after contact closure will immediatley fall across the load. Therefore, a maximum voltage will fall on the load if the commutating reactor flux is completely reversed prior to contact closure.

Thus, it is clear that a circuit controlling the degree of unsaturation of the commutating reactor prior to contact closure effects magnetic voltage control of the rectifier. The above description can be easily extended to include multiple phase systems in which the alternating potential is derived from transformers of various well known connections.

Other flux reversal circuits to accomplish magnetic voltage control merely take the potential of the proper phase of the A.-C. source of the mechanical rectifier, then rectifies this voltage and applies it to the appropriate commutating reactor.

This circuit, however, has several disadvantages. For instance, the components of the flux reversal circuit change their characteristics during operation due to heating up or an increased general ambient temperature, and the flux reversal current will be changed thereby changing the output voltage of the rectifier.

A further, and perhaps more severe, disadvantage is apparent. That is, when load current is increased by increasing the secondary voltage of the power supply, the flux reversal current will be increased accordingly. Therefore, a very small change in the A.-C. voltage will cause very wide fluctuations in the output current.

The principle of our invention is to provide a means to maintain the flux reversal current in this type of circuit to a constant value. Hence, changes in component characteristics will be automatically compensated for and variation of the A.-C. voltage to effect changes in load current will be less sensitive. That is, the output current will be proportional to the A.-C. voltage since the flux reversal is held constant.

The constant current means which is placed in series with the flux reversal circuit can be of any of the commercially available units. For instance, iron filament ballasts, oil regulators, to control the value of a series resistor, and many others.

Accordingly, a primary object of our invention is to provide means to maintain constant current in combination with a flux reversal circuit for commutating reactors in which the power is taken from the main A.-C. source.

Another object of our invention is to maintain a constant flux reversal current irregardless of changes in component characteristics.

Still another object of our invention is to provide means to maintain a constant flux reversal current irregardless of the voltage drive in the flux reversal current.

A still further object of our invention is to provide a flux reversal circuit in which changes in the D.-C. load current are approximately proportional to changes in the A.-C. input voltage.

These and other objects of our invention will be apparent from the following description when taken in connection with the single figure of this application.

The figure shows three phase half wave mechanical rectifier having our novel flux reversal system. It should be noted that the selection of this particular circuit is arbitrary and our novel flux reversal circuit has universal application to commutating reactors requiring flux reversal.

The drawing shows a D.-C. load 10 being supplied with D.-C. power from an A.-C. line 11. The A.-C. power in line 11 is transformed to an appropriate voltage by means of a main power transformer having a primary 12 and a secondary 13.

Secondary winding 13 of the main power transformer supplies power through commutating reactors 14, cooperating contacts 15 and D.-C. load 10. The cooperating contacts 15 are driven into and out of engagement by a synchronous motor 16 and engagement and disengagement of the cooperating contact 15 is in synchronism with the voltage of secondary winding 13.

A flux reversal circuit is shown in the figure as coming from the A.-C. source 13, auxiliary windings of the commutating reactors 17, rectifiers 18, means to maintain constant current shown in box 19 and back to secondary winding 13.

The particular embodiment of the constant current means used in the drawing to illustrate our principle has a variable resistor 20 and a relay coil 21 in series with the flux reversal current. Depending upon the current flowing in relay coil 21, the relay contacts will be positioned to connect the exciting winding 22 of motor 23 which is operatively connected to vary resistor 20. Hence, by setting relay coil 21 to a particular value of predetermined current, the relay contacts will be in the open position and the resistance of the resistor 20 will be constant.

If the flux reversal current increases, relay coil 21 will energize the relay contacts to connect exciting winding 22 of motor 23 in such a way that motor 23 will vary the resistance of resistor 20 until the flux reversal current returns to its predetermined value and the exciting winding 22 is disconnected from motor 23.

The operation of the circuit is as follows and is taken in connection with the phase marked A.

Flux reversal winding 17 in phase A conducts current from the moment at which the voltages of phases B and C are equal and continue to conduct until the voltages of phases A and C are equal. The current flow, therefore, lasts for 120°. Similar current flow apply to the flux reversal circuits for the commutating reactors in phases B and C.

The flux reversal current is predetermined by the setting of relay 21. Hence, current now is through flux reversal winding 17, rectifier 18, resistor 20, relay 21 and back to the A.-C. source.

If the characteristics of any of the circuit components change due to heating up or ageing, relay 21 will cause energization of motor 23 in such a way that motor 23 will vary the value of series resistor 20 to thereby return the flux reversal current to its predetermined value.

Furthermore, if the voltage of transformer winding 13 is regulated to produce changes or produce by-changes in the D.-C. load, the flux reversal current will still be maintained constant by the above mentioned process. Hence, the D.-C. load current can be easily controlled by the changes in the A.-C. voltage.

Note that if the flux reversal current were not kept at its constant value, a small change in the secondary voltage could produce a very large change in the output since the flux reversal current would change with the secondary voltage change.

The characteristic of insensitive control of the D.-C. output by change in the A.-C. input, as is achieved with our novel invention, is extremely desirable and is of great importance in many applications such as paralleling of rectifier units.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claims.

We claim:

1. In a flux reversal circuit for mechanical rectifiers; said mechanical rectifier supplying D.-C. power from an A.-C. source; a commutating reactor having an auxiliary winding; a rectifier; a variable resistor; a motor having an energizing winding; a relay having contacts and a relay winding; said A.-C. source, commutating reactor auxiliary winding, rectifier, variable resistor and relay coil connected in series; said motor operatively connected to vary said variable resistor; said relay constructed to connect said energizing winding of said motor to a predetermined polarity at a predetermined current to cause said variable resistor to vary in a predetermined manner.

2. In a flux reversal circuit for mechanical rectifiers; said mechanical rectifiers supplying D.-C. power from an A.-C. source; a commutating reactor having an auxiliary winding; a rectifier; a variable resistor; a motor having an energizing winding; a relay having contacts and a relay winding; said A.-C. source, commutating reactor auxiliary winding, rectifier, variable resistor and relay coil connected in series; said motor operatively connected to vary said variable resistor; said relay constructed to connect said energizing winding of said motor to a first position, a second position and a third position; said first, second and third positions to cause increase, decrease and no change respectively in the resistance of said variable resistor; said relay contacts positioned in response to the flux reversal current in said relay winding.

3. In a mechanical rectifier supplying D.-C. power from an A.-C. source; said mechanical rectifier having commutating reactors and flux reversal circuits therefor; a flux reversal circuit for the commutating reactors of said mechanical rectifier; said flux reversal circuit constructed to supply a unidirectional current of a predetermined magnitude for a predetermined time to said commutating reactors from said A.-C. source; a variable impedance connected in each of said flux reversal circuits and constructed to vary the current of said flux reversal circuits and means responsive to variations of said flux reversal current operatively connected to said variable impedance to cause said variable impedance to maintain said flux reversal currents at their predetermined magnitude.

4. In a rectifier for supplying D.-C. power from an A.-C. source; a saturable reactor connected in series with said A.-C. source and said D.-C. load for controlling the D.-C. output of said rectifier by controlling the flux reversal of said saturable reactor; said saturable reactor having an auxiliary winding for controlling the flux reversal of said saturable reactor; a rectifier, variable resistor, motor having an energizing winding, relay having contacts and a relay winding; said A.-C. source, saturable reactor auxiliary winding, variable resistor and relay coil connected in series; said motor operatively connected to vary said variable resistor; said relay constructed to connect said energizing winding of said motor to a predetermined polarity at a predetermined current to cause said variable resistor to vary in a predetermined manner to maintain the current in said auxiliary winding at a predetermined value.

5. In a rectifier supplying D.-C. power from an A.-C. source; said rectifier having commutating reactors connected in series therewith for controlling the output of said rectifier; a flux reversal circuit for said commutating reactors of said rectifier; said flux reversal circuit constructed to supply a unidirectional current of a predetermined magnitude for a predetermined time to said commutating reactors from said A.-C. source; a variable impedance connected in said flux reversal circuit; said variable impedance being constructed to vary said flux reversal current and means responsive to variations of said flux reversal current from said predetermined magnitude operatively connected to said variable impedance to cause said variable impedance to maintain said flux reversal current at its said predetermined magnitude.

References Cited in the file of this patent

UNITED STATES PATENTS

| | | |
|---|---|---|
| 1,614,147 | Muller | Jan. 11, 1927 |
| 1,722,152 | Meiners | July 23, 1929 |
| 2,093,197 | Kern | Sept. 14, 1937 |